Nov. 28, 1939.  R. J. KEHL  2,181,135

MULTIPLE FLAME NOZZLE

Original Filed Aug. 10, 1933

INVENTOR
ROBERT J. KEHL
BY
ATTORNEY

Patented Nov. 28, 1939

2,181,135

UNITED STATES PATENT OFFICE 2,181,135

MULTIPLE FLAME NOZZLE

Robert J. Kehl, Manhasset, N. Y., assignor, by mesne assignments, to Union Carbide and Carbon Corporation, a corporation of New York Application August 10, 1933, Serial No. 684,478
Renewed June 11, 1938

9 Claims. (Cl. 158—27.4)

This invention relates to blowpipe nozzles and has particular reference to nozzles for cutting, deseaming or welding metals.

Heretofore, one-piece and two-piece nozzles have been employed with oxyacetylene blowpipes for delivering gases to perform cutting, deseaming and welding operations on metals. In making the one-piece nozzles the number of rejects is considerable because it is quite difficult to accurately drill each of the small outlet orifice passages to exactly meet the larger gas supply passages which are drilled lengthwise of the nozzle from its rear end to within a short distance from the outlet end of the nozzle. In the two-piece nozzles, an inner tubular part is usually fitted within an outer shell which has inclined outlet orifices at the lower end, and to these orifices is delivered a mixture of fuel and oxidizing gases through an annular chamber formed between the inner part and the shell. With this type of construction it is necessary to perform a number of machining operations which make the completed two-piece nozzle relatively expensive to manufacture. Furthermore, it is practically impossible to maintain efficient heat transfer between the respective parts of multi-piece torch tips due to the light film of oxide that is always present on their contacting surfaces. Due to this condition, and the extreme heat incident to oxyacetylene cutting or welding, distortion of the respective parts of multi-piece blowpipe tips may occur and permit the leakage of gas therebetween.

The principal object of this invention is to provide an improved unitary blowpipe nozzle, in which the drilling and machining operations are simple and inexpensive; in which the flow of gas through the several nozzle passages is uniform and unobstructed by misalined drillings. The above and other objects and the novel features of this invention will be more apparent from the following description taken with the accompanying, in which:

Fig. 1 of the drawing is a longitudinal cross-sectional view of a blowpipe nozzle illustrating one embodiment of this invention;

Figure 1:
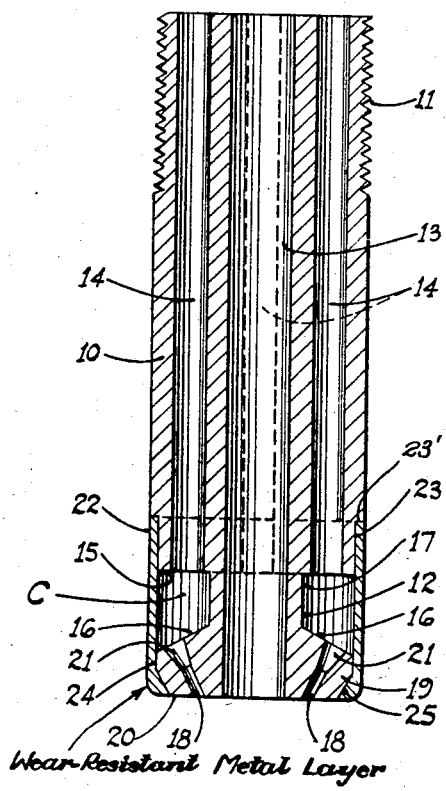

Fig. 1 illustrates a unitary multiple flame nozzle embodying this invention which is especially adapted for operations such as cutting and deseaming metals. The cylindrical body 10 of this nozzle may be made from a rod of metal such as copper, and adjacent one end is provided with suitable means, such as the threads 11, whereby the nozzle may be secured to a blowpipe head adapted to supply appropriate gases, such as oxygen and a mixture of oxygen and acetylene, to the nozzle passages. At a short distance back from its other end, the body 10 may be machined to provide a circumferential channel or groove 12 of substantial depth and width. A passage 13 of suitable diameter may extend centrally through the body 10 to supply oxygen to the work, and one or more (4 equally spaced, in this instance) combustible mixture passages 14 may be drilled from the rear end of the body parallel to the passage 13 and through the rear wall 15 of the groove 12.

The annular front wall 16 of the groove 12 is preferably inclined forwardly and outwardly from the bottom surface 17. The width of the groove 12 and the inclination of the wall 16 are desirably such that a series (4 in this instance) of equally spaced outlet passages or orifices 18 of relatively small diameter may be provided by drilling through the section 19 of the body between the grove and the front face 20. The passages 18 may be drilled rearwardly from the front face 20 of the groove, or by inserting the drill or drills from the side into the groove 12 and drilling forwardly to the face 20; and by the last-mentioned procedure, the entrances of the passages 18 may be countersunk to form a tapered inlet as at 21, if desired, to aid in producing fully formed gas flame jets issuing from the orifices of these passages.

As shown, the passages 18 are normal to the surface 16 and so inclined relatively to one another that, if extended, their axes would converge substantially at a point on the extended longitudinal axis of the nozzle and at a short distance in front of the face 20. However, the inclination of the passages 18 may be varied as desired to locate the point of convergence closer to or farther from the face 20.

The open side of the groove 12 may be closed and sealed gas-tight by suitable means, such as the metal sleeve 22, which desirably tightly fits and is silver soldered or otherwise secured to the circumferential machined portions 23 and 24 of the body and the end section 19. The machined portion 23 forms a peripheral shoulder 23' with a portion of the body 10 behind the front face 20; and the rear end of the sleeve 22 abuts against the shoulder 23' to accurately position said sleeve relative to the front face 20 of the nozzle and to resist rearward thrusts against the sleeve and thereby assists in preventing the rearward displacement of said sleeve and the wear-resistant layer thereon when the nozzle rubs against a workpiece. The depth of machining and the thickness of the sleeve are desirably the same so that the outside of the nozzle will present a smooth finished cylindrical surface of uniform diameter. The machining on the body section 19 may be inclined as at 25 and the front end of the sleeve may be shaped or bent inwardly against the surface 25 to eliminate a sharp corner at the front end of the nozzle; and the outer surface of the inturned end of the sleeve may be covered with a layer of wear-resistant metal forming a composite metal ring including said wear-resistant metal and the metal of sleeve 22, to further protect the corner of the nozzle and reduce the wear at the periphery of its front face when the same rubs against the work when in use. Metal such as that disclosed and claimed in United States Patent 1,057,423 to Elwood Haynes has been found to be particularly suitable for this purpose because it is highly resistant to wear even at temperatures near the ignition temperature of steel. This annular layer of wear-resistant material encircling the nozzle body adjacent but behind the front face of the nozzle provides a work-contacting portion of such material irrespective of the final rotative position the nozzle may assume when it is firmly coupled to a blowpipe head.

The sleeve 22 and the walls of the groove 12 together provide an annular chamber C within the unitary nozzle, which chamber receives the gaseous preheating mixture from the inlet passages 14 and uniformly distributes this mixture to the passages 18. The entrances to the passages 18 may be directly opposite the discharge ends of the passages 14 or they may be offset radially or angularly, as desired; but in any event the intermediate chamber C serves to evenly distribute the gas to the passages 18 and thus produces flame jets of uniform intensity.

Figure 3:
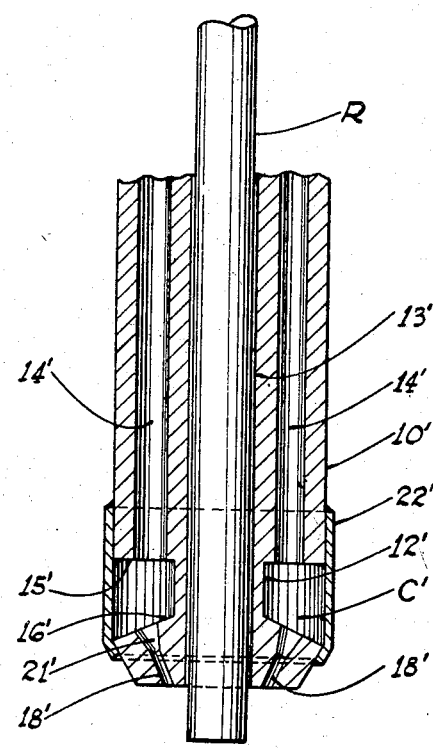
Fig. 3 shows a cross-sectional view of a portion of another blowpipe nozzle embodying this invention.
Figure 2:
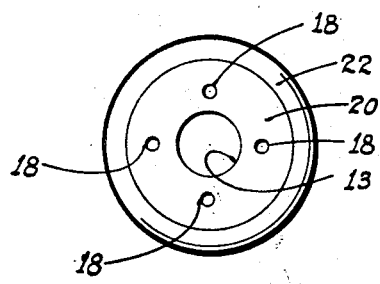
Fig. 2 is a plan view of the outlet end of the nozzle shown in Fig. 1.

In some types of blowpipe nozzles embodying this invention the central passage 13 may be omitted, or this passage may be employed in a welding nozzle as a guideway for feeding a welding rod to the work to be welded. A construction of the latter type is illustrated in Fig. 3 in which the central passage 13' is designed to guide a welding rod R to the work. Here, the flames produced by the gas jets issuing from the passages 18' may impinge against and preheat the rod R before it is melted by a welding flame and deposited upon the work. Otherwise the construction and operation of the nozzle shown in Fig. 3 is substantially the same as the one shown in Figs. 1 and 2, except that the sleeve 22' shown in Fig. 3 is somewhat shorter than the sleeve 22 and is not fitted into machined portions of the body 10' but is simply soldered gas-tightly to the latter over the groove therein.

It will be seen that the present invention provides an improved unitary blowpipe nozzle which is comparatively easy and inexpensive to manufacture, and in which the converging drillings forming the small mixture outlets may be inclined at almost any desired angle to the nozzle axis and still not present the manufacturing difficulties heretofore encountered in drilling these small passages to exactly meet those passages drilled part way through the nozzle body from its other end.

Although certain embodiments of the improved nozzle have been shown and described in detail, it will be understood that various changes may be made without departing from the principles of this invention.

I claim:

1. A blowpipe nozzle comprising a unitary nozzle body having angularly related gas inlet and gas outlet passages drilled therein, and a chamber between said inlet and outlet passages, said chamber comprising a circumferential groove formed in said body and a sleeve covering said groove and secured to said body.

2. A blowpipe nozzle comprising the combination of a metallic body having a central passage therethrough and an annular groove at the lower end thereof, said groove having a lower surface disposed at an angle to the axis of the central passage of said body, a plurality of drilled passages therein parallel to and surrounding said central passage and connected with said groove, a plurality of drilled passages perpendicular to the lower surface of said groove and leading from said groove to the lower end of said body, and a separate sleeve adapted to enclose said groove, said sleeve being permanently secured to said body.

3. A nozzle comprising a unitary body having a circumferential groove formed therein near the discharge end of the nozzle, the front wall of said groove being inclined outwardly and forwardly; said body having a fluid inlet passage drilled therein and extending longitudinally thereof and opening into said groove; said body also having a fluid discharge passage drilled therein and having its inlet in said front wall and its outlet at the discharge end of said nozzle, said discharge passage having its axis inclined forwardly and inwardly toward the main axis of said body; and a sleeve fluid-tightly secured to said body and constituting a circumferential outer closing wall for said groove.

4. A nozzle as claimed in claim 3, in which the inlet of said discharge passage is tapered.

5. A blowpipe nozzle comprising a unitary body having a circumferential groove formed therein near the discharge end of the nozzle, the front wall of said groove being inclined outwardly and forwardly; said body having a passage extending axially therethrough; said body also having another passage drilled in and extending longitudinally thereof and opening into said groove; said body further having a third passage drilled therein and communicating with said groove and having its outlet at the discharge end of said nozzle, said third passage having its axis inclined forwardly and inwardly toward the axis of the first-mentioned passage; and a sleeve gas-tightly secured to said body and constituting a circumferential outer closing wall for said groove.

6. A nozzle comprising a unitary body having a circumferential groove formed therein near the lower end of the nozzle; said body having a fluid inlet passage drilled therein and extending longitudinally of said body and opening into said groove; said body also having a fluid discharge passage drilled therein and extending from said groove to the lower end of the nozzle; and a relatively thin sleeve permanently attached to said body both above and below said groove and constituting an outer closing wall for said groove, at least the lower end of said sleeve at the point of its attachment to said body comprising a layer of wear-resistant metal.

7. A blowpipe nozzle comprising a metal nozzle body having gas passages extending therethrough and provided with gas outlets in the front face of said body; a metal sleeve secured to said body and surrounding said body behind but adjacent said front face; and an annular protective layer of wear-resistant metal permanently united to the outer surface of said sleeve and covering at least the annular portion of said surface adjacent but behind the periphery of said front face, both said sleeve and said protective layer being independent of and spaced outwardly from said gas outlets, said protective layer being more resistant to wear than said body and said sleeve to reduce wear adjacent and behind the periphery of said front face when said periphery rubs against the work during the use of said nozzle.

8. A blowpipe nozzle comprising a metal body having gas passages extending therethrough and terminating at gas outlets in the front face of said body, said body also having a peripheral shoulder behind said front face; and a composite metal ring extending circumferentially of said body behind said front face and secured to said body in abutting relation to said shoulder, said composite ring comprising a metal sleeve and an annular protective layer of wear-resistant metal permanently united to the outer surface of said sleeve and covering at least the annular portion of said surface adjacent but behind the periphery of said front face, both said sleeve and said protective layer being independent of and spaced outwardly from said gas outlets, said protective layer being more resistant to wear than said sleeve to reduce wear at the periphery of said front face when such periphery rubs against a workpiece during the use of said nozzle.

9. A blowpipe nozzle comprising an elongated body of metal (such as copper), said body having an oxidizing gas passage and a plurality of combustible gas passages extending longitudinally therethrough, all of said passages terminating at outlets in the front face of said body, said body having a circumferential machined portion and a shoulder, both behind said front face; and a composite metal ring permanently secured to said body and extending circumferentially of said body adjacent to but behind said front face, said ring comprising an annular metal sleeve secured to said body and having its inner side bearing against said machined portion and its rear end bearing against said shoulder, and an annular protective layer of wear-resistant metal (such as an alloy of cobalt, chromium and tungsten) permanently united to the outer surface of said sleeve and covering at least the annular portion of said surface adjacent but behind the periphery of said front face, both said sleeve and said protective layer being independent of and spaced outwardly from said gas outlets.

ROBERT J. KEHL.